United States Patent
Saito

(10) Patent No.: US 9,798,836 B2
(45) Date of Patent: Oct. 24, 2017

(54) ANALYZING APPARATUS FOR SHAPE OF PART OF STRUCTURAL BODY

(71) Applicant: JFE Steel Corporation, Tokyo (JP)

(72) Inventor: Takanobu Saito, Tokyo (JP)

(73) Assignee: JFE Steel Corporation (JP)

( * ) Notice: Subject to any disclaimer, the term of this patent is extended or adjusted under 35 U.S.C. 154(b) by 556 days.

(21) Appl. No.: 14/384,422

(22) PCT Filed: Mar. 1, 2013

(86) PCT No.: PCT/JP2013/055659
§ 371 (c)(1),
(2) Date: Sep. 11, 2014

(87) PCT Pub. No.: WO2013/137022
PCT Pub. Date: Sep. 19, 2013

(65) Prior Publication Data
US 2015/0154319 A1    Jun. 4, 2015

(30) Foreign Application Priority Data

Mar. 15, 2012 (JP) .................................. 2012-058088
Jul. 19, 2012 (JP) .................................. 2012-160124

(51) Int. Cl.
*G06F 17/50* (2006.01)

(52) U.S. Cl.
CPC .......... *G06F 17/50* (2013.01); *G06F 17/5009* (2013.01); *G06F 17/5086* (2013.01);
(Continued)

(58) Field of Classification Search
CPC ....................................................... G06F 17/50
(Continued)

(56) References Cited

U.S. PATENT DOCUMENTS 5,975,703 A * 11/1999 Holman ............. G03B 21/2073
349/9
7,657,412 B2   2/2010 Honma et al.
(Continued)

FOREIGN PATENT DOCUMENTS

CN    1760877           4/2006
JP    02267497 A   *   11/1990
(Continued)

OTHER PUBLICATIONS

Densis, Classical and non-classical solutions of a prescribed curvature equation, Jun. 13, 2007.*
(Continued)

*Primary Examiner* — Lechi Truong
(74) *Attorney, Agent, or Firm* — DLA Piper LLP (US)

(57) ABSTRACT

An optimization analyzing apparatus, configured of a computer, includes: a part shape pattern setting device that divides a part of a structural body including a two-dimensional element and/or a three-dimensional element into a plurality of segments in an axis direction, changes a height or width of a cross section of each of the segments divided, and sets a part shape pattern; a rigidity analyzing device that performs plural kinds of rigidity analyses of the structural body; a multivariate analyzing device that obtains a multiple regression coefficient, and a coefficient of determination or an adjusted R-square; a rigidity analysis selection device that selects any having strong correlation from among the rigidity analyses of the plural kinds; and a cross-sectional shape determination device that determines a cross-sectional shape of each of the segments divided.

3 Claims, 13 Drawing Sheets

(52) U.S. Cl.
CPC ...... *G06F 17/5095* (2013.01); *G06F 2217/08* (2013.01); *G06F 2217/16* (2013.01)

(58) Field of Classification Search
USPC .......................................................... 703/1
See application file for complete search history.

(56) References Cited

U.S. PATENT DOCUMENTS

| | | | |
|---|---|---|---|
| 2005/0211870 A1* | 9/2005 | Browne | B29C 33/44 249/134 |
| 2009/0085257 A1* | 4/2009 | Yang | B29C 67/0088 264/401 |
| 2013/0321398 A1* | 12/2013 | Howard | G06T 19/00 345/419 |

FOREIGN PATENT DOCUMENTS

| | | |
|---|---|---|
| JP | 2002-161730 | 6/2002 |
| JP | 2002-215680 A | 8/2002 |
| JP | 2002-297675 A | 10/2002 |
| JP | 2003-216658 A | 7/2003 |
| JP | 2006-330917 A | 12/2006 |

OTHER PUBLICATIONS

Chinese Office Action dated Aug. 9, 2016, of corresponding Chinese Application No. 201380013844.3, along with a Concise Statement of Relevance of Office Action in English.
Supplementary European Search Report dated Dec. 17, 2015 of corresponding European Application No. 13761395.6.
Akbarzadeh-T, M.-R., et al., "Adaptive fuzzy fitness granulation for evolutionary optimization," *International Journal of Approximate Reasoning*, vol. 49, No. 3, Nov. 1, 2008, pp. 523-538.
Woon, S., et al., "Effective optimization of continuum topologies through a multi-GA system," *Computer Methods in Applied Mechanics and Engineering*, vol. 194, No. 30-33, Aug. 12, 2005, pp. 3416-3437.
Martiínez, F., et al., "Design of tall bridge piers by ant colony optimization," *Engineering Structures*, vol. 33, No. 8, Apr. 1, 2011, pp. 2320-2329.
Mihaylova, P., et al., "Beam Bounding Box—a novel approach for beam concept modeling and optimization handling," *Finite Elements in Analysis and Design*, vol. 60, May 12, 2012, pp. 13-24.
Liu Jian Zhong et al., "Development of Size Optimum Problem on Configuration Design," Bulletin of Japanese Society for Science of Design, vol. 41, No. 3, Sep. 20, 1994, pp. 9-16 (partial translation).

* cited by examiner

ANALYZING APPARATUS FOR SHAPE OF PART OF STRUCTURAL BODY

TECHNICAL FIELD

This disclosure relates to an analyzing apparatus for a shape of a part of a structural body, which controls a shape of a part (hereinafter, also referred to as "structural part") that forms a structural body such as an automotive body, for example.

BACKGROUND

Conventionally, in many industries, weight reduction of structural bodies has been promoted. Particularly in the automotive industry, weight reduction of automotive bodies due to environmental issues has been promoted recently. In designing such an automotive body, an analysis using computer-aided engineering (hereinafter, referred to as "CAE analysis") has been an indispensable technique.

The CAE analysis has been known as an analytical technique capable of improving rigidity of a structural body or achieving the weight reduction of an automotive body by using a technique such as mathematical optimizers, a plate thickness optimization method, a shape optimization method, or a topology optimization method (see, for example, Japanese Laid-open Patent Application No. 2006-330917). As a shape optimization method from among the above-mentioned optimization techniques, an optimization method that equally changes a shape of a structural part by using a representative dimension of the structural part has been used generally.

The conventionally performed shape optimization method for a part of a structural body is a method of performing analysis by changing a shape of the entire part. Hence, it is impossible to obtain accurate results from this analysis. Therefore, the conventional shape optimization methods have been insufficient as optimization methods of a shape of a part. Furthermore, when a rigidity analysis is performed in controlling the shape of a part, a method of analyzing by determining load and constraint conditions suitable to the part alone has been conventionally general. Hence, load transfer or the like when that part is incorporated in a structural body such as an automotive body is not reproduced correctly. Therefore, the shape optimization methods of structural parts have been insufficient.

It could therefore be helpful to provide analyzing apparatus for a shape of a structural part, which uses a multivariate analysis and is able to accurately control the shape of a part of a structural body.

SUMMARY

We thus provide:

An analyzing apparatus for shaping a part of a structural body including a part shape pattern setting device that divides a part of a structural body including a two-dimensional element and/or a three-dimensional element into a plurality of segments in an axis direction, changes a height or width of a cross section of each of the segments divided, and sets a part shape pattern; a rigidity analyzing device that performs plural kinds of rigidity analyses of the structural body in a state in which the part for which the part shape pattern has been set by the part shape pattern setting device is incorporated in the structural body and obtains any of: rigidity; improvement rate of rigidity; and improvement rate of rigidity per increased unit weight, of the structural body for each kind of the rigidity analyses; a multivariate analyzing device that performs a multivariate analysis for each kind of the rigidity analyses where any of the rigidity, the improvement rate of rigidity, and the improvement rate of rigidity per increased unit weight of the structural body that have been obtained by the rigidity analyzing device is a response variable and any of the height, the width, and a section modulus of each of the segments divided is an explanatory variable, and obtains a multiple regression coefficient, and a coefficient of determination or an adjusted R-square; a rigidity analysis selection device that selects, based on any of the coefficient of determination and the adjusted R-square, any having strong correlation from among the rigidity analyses of the plural kinds; and a cross-sectional shape determination device that determines, based on the multiple regression coefficient calculated by the multivariate analyzing device in a rigidity analysis selected by the rigidity analysis selection device, a cross-sectional shape of each of the segments divided.

The analyzing apparatus for shaping a part of a structural body is characterized in that the multivariate analyzing device calculates a standard partial regression coefficient, and the optimization analyzing apparatus further comprises a shape change priority determination device that determines, based on the standard partial regression coefficient, a priority of change in shape of each segment for each of the plural kinds of rigidity analyses.

The analyzing apparatus for shaping parts of a structural body is characterized in that the cross-sectional shape determination device determines a shape of a boundary portion of each of the segments divided or a shape in the vicinity of the boundary portion to be a gradually changing shape.

Figure 1:
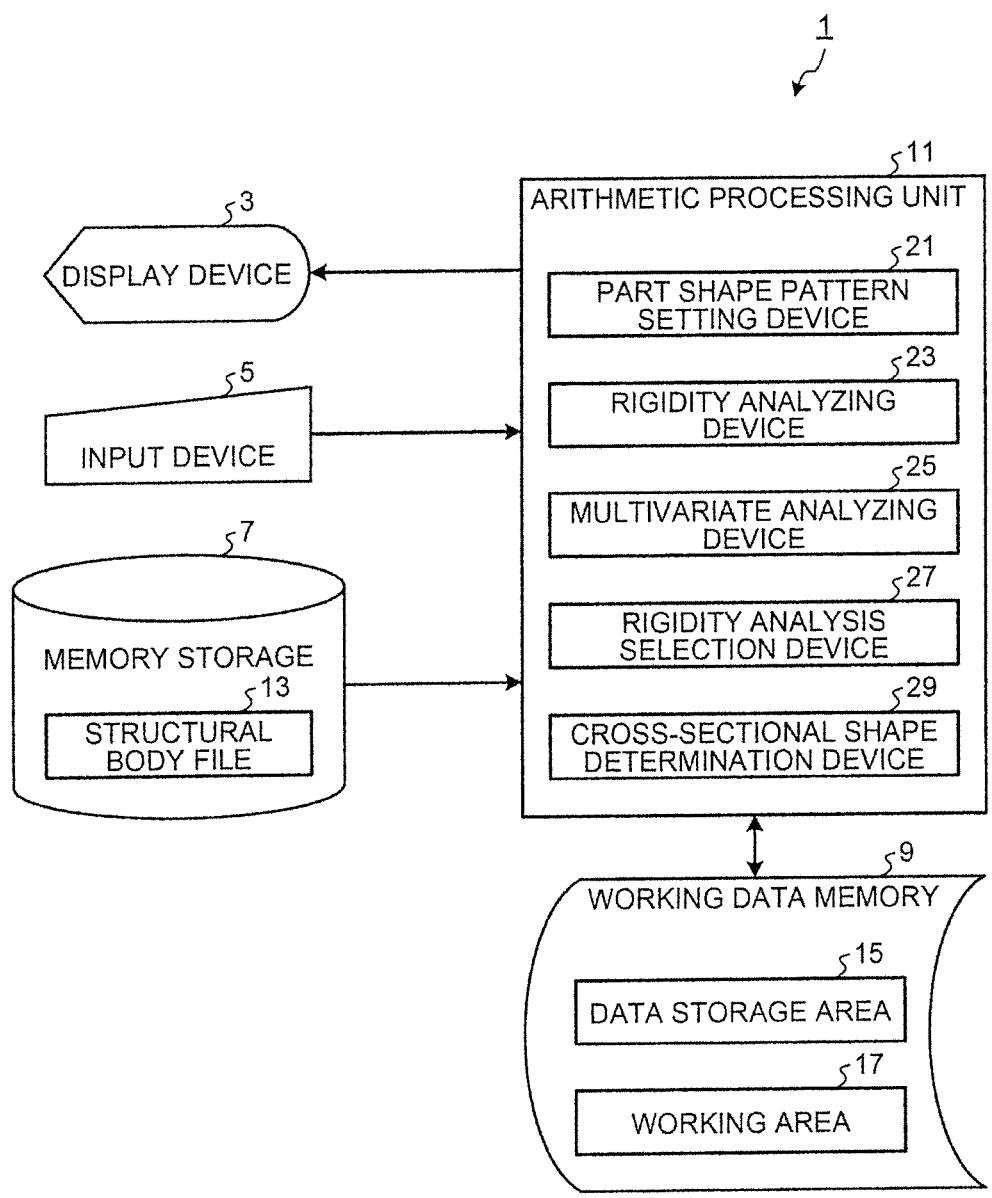
FIG. 1 is a block diagram illustrating an example of the constitution of an analyzing apparatus for shaping a structural part according to one of our examples.

REFERENCE SIGNS LIST 1 optimization analyzing apparatus
3 display device
5 input device
7 memory storage
9 working data memory
11 arithmetic processing unit
13 structural body file
15 data storage area
17 working area
21 part shape pattern setting device
23 rigidity analyzing device
27 multivariate analyzing device
29 rigidity analysis selection device
31 cross-sectional shape determination device
33 automotive body
35 rear side member
39 coiled spring leg
41 vertical wall portion
43 top plate portion
41 B pillar
43 side member
331, 332, 333 segment
334, 335 gradual change zone
511, 512, 513, 514, 515, 516 predetermined portion

DETAILED DESCRIPTION

Hereinafter, preferred examples of an analyzing apparatus for shaping a structural part (hereinafter, simply referred to as "optimization analyzing apparatus") are explained in detail referring to the drawings.

Figure 2:
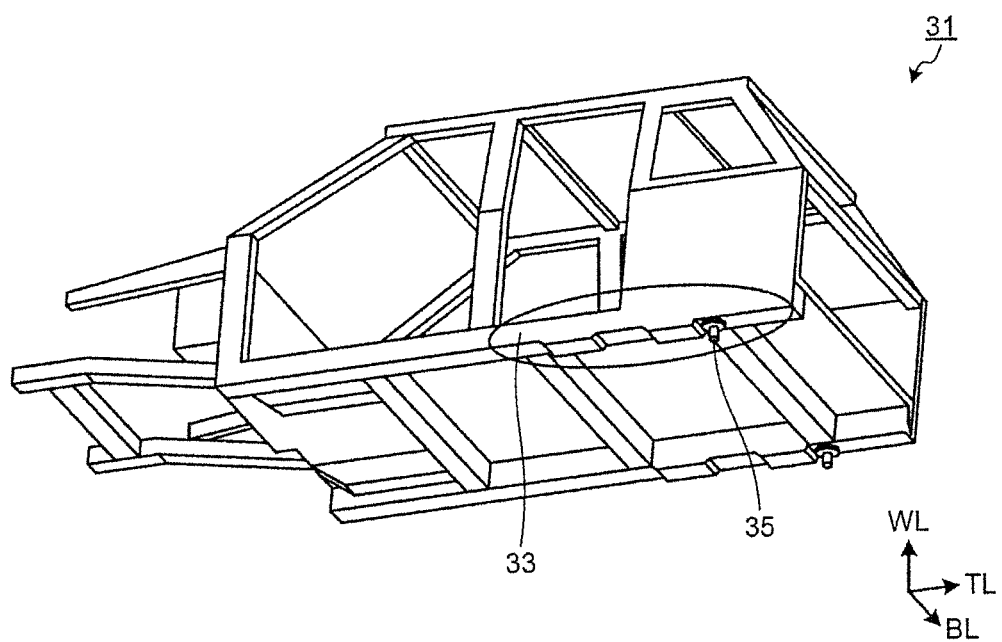
FIG. 2 is an explanatory view explaining an example of a structural body.

An optimization analyzing apparatus 1 according to one example, the optimization analyzing apparatus 1 being illustrated in FIG. 1 is an apparatus that performs calculation by numerical analysis with respect to a shape of a part of a structural body constituted with two-dimensional elements and/or three-dimensional elements. The structural body in the example includes, as an example, an automotive body 31 illustrated in FIG. 2. The part that constitutes the structural body in this example includes, as an example, a rear side member 33 illustrated in FIG. 3 or the like. Furthermore, in this example, as illustrated in FIG. 2, the width direction of the automotive body 31 is referred to as a BL direction, the height direction of the automotive body 31 is referred to as a WL direction, and the longitudinal direction of the automotive body 31 is referred to as a TL direction. First, the rear side member 33 is explained below.

Figure 3:
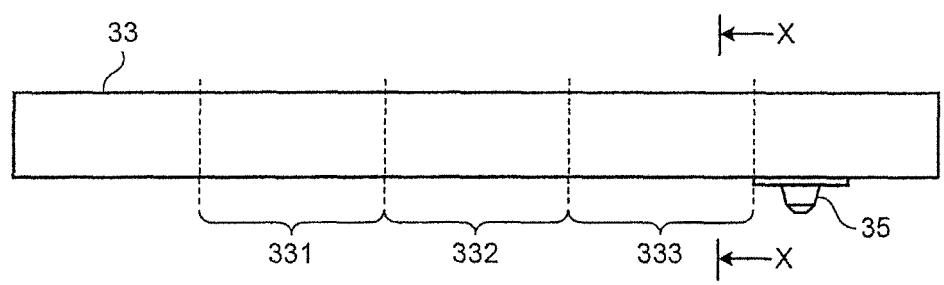
FIG. 3 is an explanatory view explaining a part of the structural body illustrated in FIG. 2.
Figure 4:
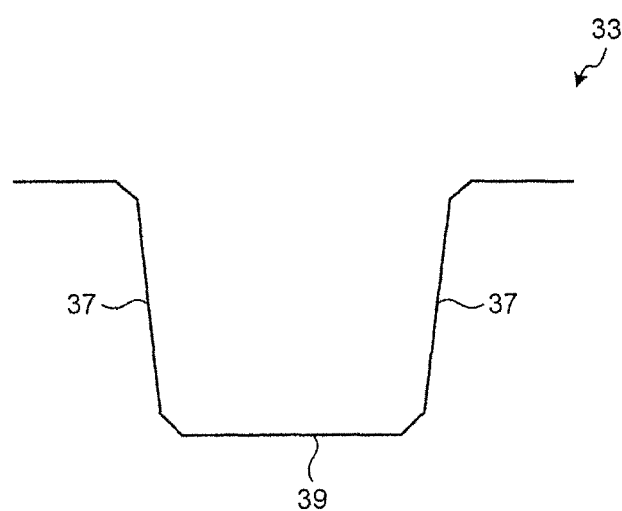
FIG. 4 is a cross-sectional view taken along a line X-X with respect to a part illustrated in FIG. 3 as viewed in the direction indicated by arrows.

The rear side member 33 is, as illustrated in an area surrounded by an ellipse in FIG. 2, a part that constitutes a rearward lower portion of the automotive body 31. Only the rear side member 33 separated from the automotive body 31 is illustrated in FIG. 3. The rear side member 33 is, as illustrated in FIG. 3 and FIG. 4, a long strip-shaped hat cross-sectional part. The rear side member 33 has, as illustrated in FIG. 3, a coiled spring leg 35. The coiled spring leg 35 supports a coiled spring mounted on a lower surface in the vicinity of one end portion of the rear side member 33. The rear side member 33 is, as illustrated in FIG. 2, attached to the automotive body 31 in a manner extending the coiled spring leg 35 toward the lower side of the automotive body 31. Hereinafter, the optimization analyzing apparatus 1 that obtains the controlled shape of the rear side member 33 is explained referring to FIG. 1.

The optimization analyzing apparatus 1 is constituted of a personal computer (PC) and has, as illustrated in FIG. 1, a display device 3, an input device 5, a memory storage 7, a working data memory 9, and an arithmetic processing unit 11. Furthermore, the arithmetic processing unit 11 connects thereto the display device 3, the input device 5, the memory storage 7, and the working data memory 9. The display device 3, the input device 5, the memory storage 7, and the working data memory 9 respectively perform functions in response to instructions of the arithmetic processing unit 11.

Display Device

The display device 3 displays thereon various kinds of information such as input information by the input device 5 and results of calculating by the arithmetic processing unit 11. The display device 3 is constituted by using a liquid crystal display (LCD) monitor or the like. Input device The input device 5 inputs, in response to input operations by an operator, various kinds of information such as instruction information that instructs the display of a structural body file 13 in the memory storage 7 and analysis conditions. The input device 5 is constituted by using a keyboard, a mouse, or the like.

Memory Storage

The memory storage 7 stores therein at least various kinds of information such as the structural body file 13. The structural body file 13 is information indicative of types, combinations, or the like of respective elements that constitute a structural body. The structural body may be constituted only of two-dimensional elements or only of three-dimensional elements, or may be constituted of two-dimensional elements and three-dimensional elements that are combined with each other. For example, the automotive body 31 designated as an example of the structural body is, as illustrated in FIG. 2, mainly formed by steel sheet. That is, the automotive body 31 is mainly constituted of two-dimensional elements. Furthermore, among respective elements that constitute the automotive body 31, a block body or the like may be formed of three-dimensional elements.

Working Data Memory

The working data memory 9 has a data storage area 15 for storing calculation results and a working area 17 for performing arithmetic processing.

Arithmetic Processing Unit

The arithmetic processing unit 11 is constituted of a central processing unit (CPU) of the PC. Each device in the arithmetic processing unit 11 explained below is realized by predetermined programs executed by the CPU.

In this example, the arithmetic processing unit 11 realizes a part shape pattern setting device 21 that divides a part of a structural body constituted of two-dimensional elements and/or three-dimensional elements into a plurality of portions in one axis direction and changes cross-sectional heights or widths with respect to the respective portions divided to set a part shape pattern, a rigidity analyzing device 23 that performs plural kinds of rigidity analyses for the structural body in a state that the part to which the part shape pattern is set by the part shape pattern setting device 21 is incorporated in the structural body to obtain any of the rigidity, improvement rate of rigidity, and improvement rate of rigidity per increased unit weight of the structural body for each kind of the above-mentioned rigidity analyses, a multivariate analyzing device 25 that sets any of the rigidity, improvement rate of rigidity, and improvement rate of rigidity per increased unit weight of the structural body that are obtained by the rigidity analyzing device 23 as a response variable, sets any of the height, width, and section modulus of the above-mentioned each portion divided as an explanatory variable, performs a multivariate analysis for each kind of the rigidity analyses to obtain a multiple regression coefficient, and a coefficient of determination or an adjusted R-square, a rigidity analysis selection device 27 that selects any having strong correlation from among the rigidity analyses of the plural kinds based on any of the above-mentioned coefficient of determination and adjusted R-square, and a cross-sectional shape determination device 29 that determines the cross-sectional shape of the above-mentioned each portion divided based on the above-mentioned multiple regression coefficient calculated by the above-mentioned multivariate analyzing device 25 in the rigidity analysis selected by the rigidity analysis selection device 27. Hereinafter, the respective devices are explained in detail referring to FIG. 1 to FIG. 13.

Part Shape Pattern Setting Device

The part shape pattern setting device 21 divides a part of a structural body constituted of two-dimensional elements and/or three-dimensional elements into a plurality of portions in one axis direction, changes a cross-sectional height or width with respect to each portion divided to set a part shape pattern. In this example, as an example, the part shape pattern setting device 21 divides the rear side member 33 illustrated in FIG. 3 into segments 331, 332, and 333. The segments 331, 332, and 333 are three portions into which the middle portion of the rear side member 33 is divided in the TL direction. The part shape pattern setting device 21 changes the cross-sectional heights of the respective segments 331, 332, and 333 to set the part shape pattern of the rear side member 33.

Figure 5A:
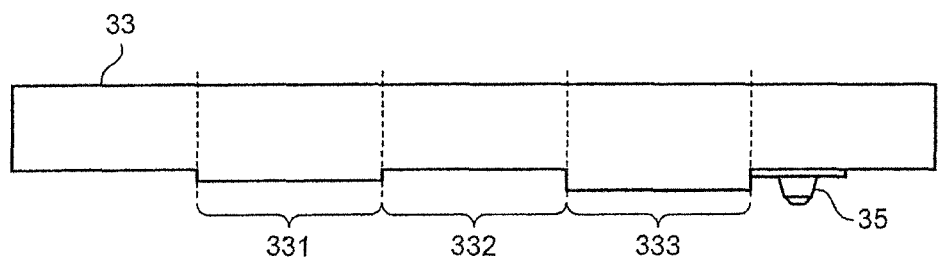
FIG. 5A is an explanatory view explaining a method of setting a shape of the part illustrated in FIG. 3.
Figure 5B:
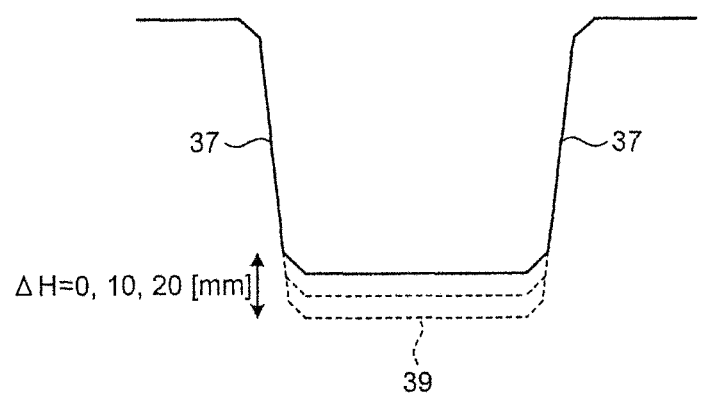
FIG. 5B is an explanatory view explaining an example of cross-sectional height variation of the part illustrated in FIG. 3.
Figure 5C:
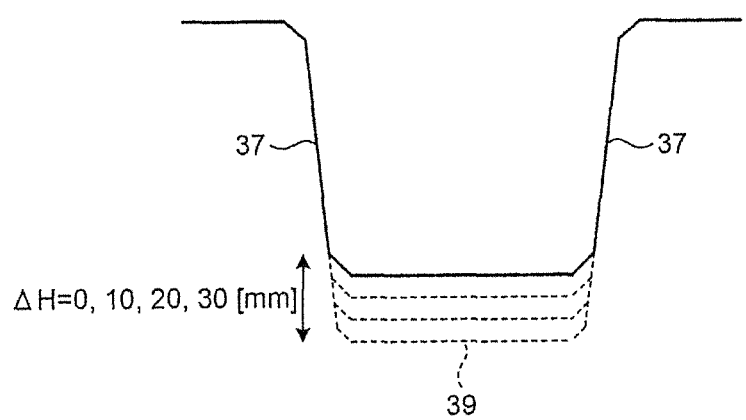
FIG. 5C is an explanatory view explaining another example of cross-sectional height variation of the part illustrated in FIG. 3.
Figure 6:
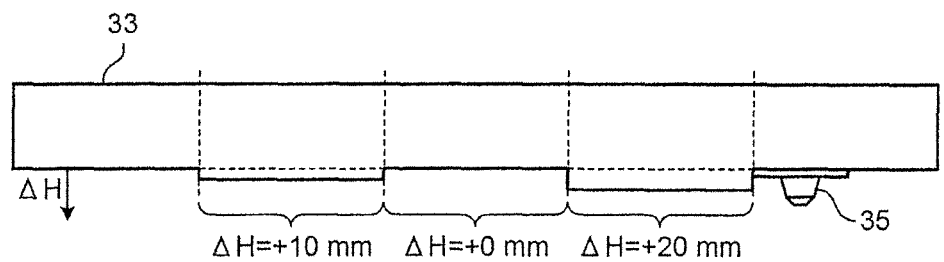
FIG. 6 is an explanatory view explaining one aspect of the shape of the part illustrated in FIG. 3.

The rear side member 33 is, as illustrated in FIG. 4, the hat cross-sectional part having vertical wall portions 37 and a top plate portion 39. In this example, the change in cross-sectional height mentioned above means that the lengths of the vertical wall portions 37 in at least one of the respective segments 331, 332, and 333 of the rear side member 33 are changed to change a distance from a standard shape of the rear side member 33 to the top plate portion 39. In such a change in cross-sectional height, the standard shape of the rear side member 33 is, as an example illustrated in FIG. 3, a shape such that the outer surface of the top plate portion 39 is flat in the longitudinal direction of the rear side member 33 (in the TL direction of the automotive body 31 illustrated in FIG. 2). A displacement ΔH illustrated in FIGS. 5B and 5C is a displacement of the distance from the standard shape of the rear side member 33 to the top plate portion 39; that is, a displacement of the cross-sectional height from the standard shape of the rear side member 33. In FIGS. 5B and 5C, the standard shapes of the rear side member 33 are illustrated by solid lines.

In this example, the part shape pattern setting device 21 changes, for example, as illustrated in FIG. 5B, the displacement ΔH of each cross-sectional height of the segments 331 and 333 to any of three displacements (0 mm, 10 mm, and 20 mm). Furthermore, the part shape pattern setting device 21 changes, for example, as illustrated in FIG. 5C, the displacement ΔH of the cross-sectional height of the segment 332 to any of four displacements (0 mm, 10 mm, 20 mm, and 30 mm). Accordingly, there exist in total 36 (=3× 4×3) combinations of the shapes of the segments 331, 332, and 333 set by the part shape pattern setting device 21; that is, part shape patterns of the rear side member 33. As an example of the part shape pattern, when the part shape pattern setting device 21 sets the displacement of the cross-sectional height of the segment 331 to 10 mm, sets the displacement of the cross-sectional height of the segment 332 to 0 mm, and sets the displacement of the cross-sectional height of the segment 333 to 20 mm, the rear side member 33 forms a shape illustrated in FIG. 6 in accordance with the setting of the displacements ΔH of these cross-sectional heights. In such a setting of the part shape pattern, the shape of the segment whose displacement ΔH is 0 mm among the segments 331, 332, and 333 is same as the standard shape of the above-mentioned rear side member 33.

Rigidity Analyzing Device

The rigidity analyzing device 23 performs plural kinds of rigidity analyses of the structural body in a state that the part to which the part shape pattern is set by the part shape pattern setting device 21 is incorporated in the structural body to be analyzed to obtain any of the rigidity, improvement rate of rigidity, and improvement rate of rigidity per increased unit weight of the structural body for each kind of the rigidity analyses. As the kinds of a plurality of rigidity analyses performed by the rigidity analyzing device 23, for example, torsional rigidity of the automotive body 31, local rigidity at a place to which a part is attached, or the like is designated. Each of these plural kinds of rigidity analyses is further subdivided for each load and constraint condition.

In this example, the rigidity is a value obtained as a result of the rigidity analysis performed by the rigidity analyzing device 23. The improvement rate of rigidity is an index indicating the degree of improvement of the rigidity of a structural body after setting a part shape pattern in comparison with a structural body having a standard shape. The improvement rate of rigidity is, for example, useful to find the degree of improvement of the rigidity of a structural body after setting a part shape pattern in comparison with a structural body having a standard shape; that is, the tendency of improvement thereof. The improvement rate of rigidity per increased unit weight is an index indicating the degree of improvement of the rigidity rate per increased unit weight of a structural body. The improvement rate of rigidity per increased unit weight is calculated by dividing the above-mentioned improvement rate of rigidity by an increased weight of a structural body or a part thereof. The improvement rate of rigidity per increased unit weight is useful to obtain an optimized shape of a part in consideration of the weight of the structural body.

Figure 7:
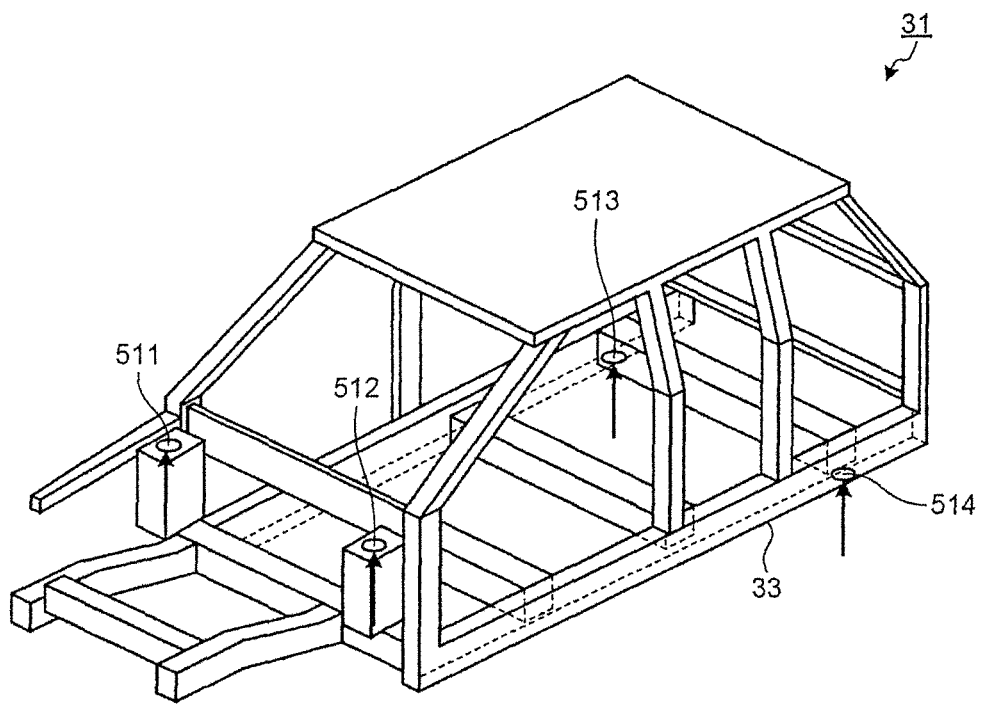
FIG. 7 is an explanatory view explaining an example of load and constraint conditions as an analysis condition.

The rigidity analyzing device 23 in this example performed the torsional rigidity analysis and the local rigidity analysis as examples of the plural kinds of rigidity analyses. In the torsional rigidity analysis, the rigidity analyzing device 23 incorporates, as illustrated in FIG. 7, the rear side member 33 in the automotive body 31. Subsequently, the rigidity analyzing device 23 constrains three portions among predetermined portions 511, 512, 513, and 514 of the automotive body 31 and, at the same time, applies a predetermined load (an upward load of 0.5 kN, for example) to the other one portion as illustrated by arrows in FIG. 7. The predetermined portions 511 and 512 of the automotive body 31 are, for example, as illustrated in FIG. 7, portions each of which is a portion of a shock absorber mount for mounting a shock absorber thereon. On the other hand, the predetermined portions 513 and 514 are, for example, as illustrated in FIG. 7, portions each of which is a portion of the above-mentioned coiled spring leg 35. The rigidity analyzing device 23 obtained, as described above, the torsional rigidity of the automotive body 31 by analyzing in applying the upward load to the automotive body 31. The rigidity analyzing device 23 sequentially changes a portion for applying the upward load in the automotive body 31 to any of the predetermined portions 511, 512, 513, and 514. Accordingly, the number of the above-mentioned load conditions of the torsional rigidity analyses becomes four (4) in total.

Figure 8:
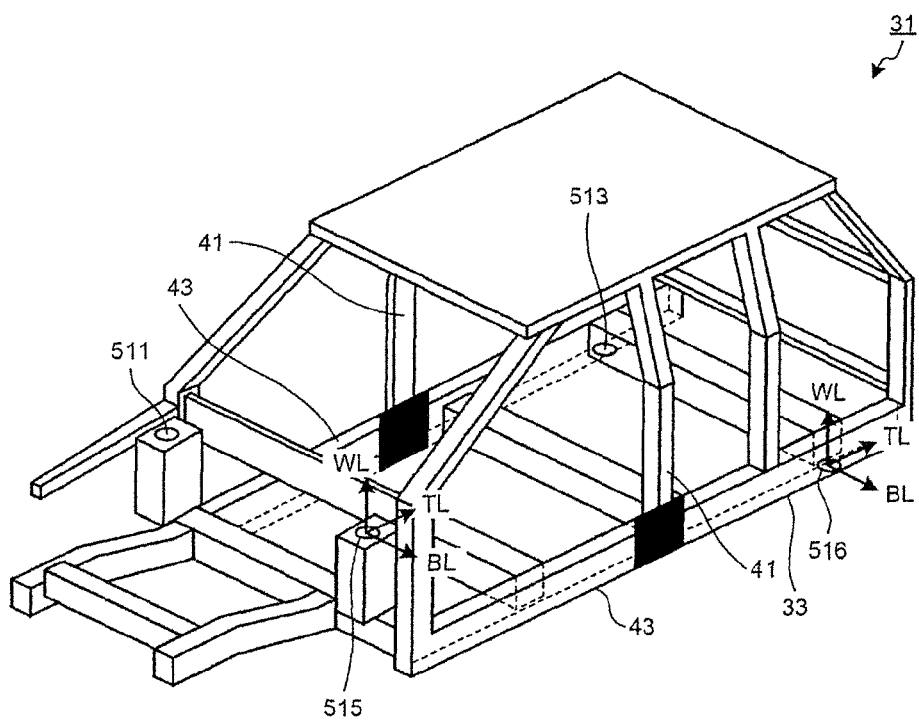
FIG. 8 is an explanatory view explaining another example of load and constraint conditions as an analysis condition.

In the local rigidity analysis, the rigidity analyzing device 23 incorporates, as illustrated in FIG. 8, the rear side member 33 of the automotive body 31. Subsequently, the rigidity analyzing device 23 constrains, as illustrated in FIG. 8, a predetermined portion of the automotive body 31 such as a portion in the vicinity of a connection portion between the lower portion of a B pillar 41 located at the middle of the automotive body 31 and a side member 43 (a portion indicated by a black square in FIG. 8). The rigidity analyzing device 23 applies, while maintaining a constrained state of the automotive body 31, a load to a predetermined portion 515 or a predetermined portion 516 of the automotive body 31 in one direction chosen among the BL direction, the WL direction, and the TL direction as illustrated by arrows in FIG. 8. In this example, the predetermined portion 515 of the automotive body 31 is, as illustrated in FIG. 8, a portion such as the above-mentioned shock absorber mount. On the other hand, the predetermined portion 516 of the automotive body 31 is, as illustrated in FIG. 8, a portion such as the above-mentioned coiled spring leg 35. The predetermined portion 515 or 516 may be, since the automotive body 31 has a bilaterally symmetrical shape, one of both-side shock absorber mounts or one of both-side coiled spring legs 35. The rigidity analyzing device 23 obtained, by applying a load to the automotive body 31 as described above, the displacement of the portion to which the load is applied in the automotive body 31 by the analysis. The rigidity analyzing device 23 sequentially changes a portion to which the load is applied in the automotive body 31 to any of the remaining predetermined portions 515 and 516 and, at the same time, subsequently changes the direction in which the load is applied to any of the BL direction, the WL direction, and the TL direction. Accordingly, the number of the above-mentioned load conditions of the local rigidity analyses becomes six (6) in total.

As mentioned above, in this example, the number of the load conditions of the torsional rigidity analyses by the rigidity analyzing device 23 is four (4). Furthermore, the number of the load conditions of the local rigidity analyses by the rigidity analyzing device 23 is six (6). Accordingly, the number of the kinds of the rigidity analyses performed by the rigidity analyzing device 23 is ten (10).

Furthermore, as described above, the number of the part shape pattern of the rear side member 33 that is set by the part shape pattern setting device 21 is 36. The rigidity analyzing device 23 performs analyses for each of the 36 part shape patterns in accordance with the load conditions in the respective kinds of the above-mentioned total ten (10) rigidity analyses. Accordingly, there exist 360 (=36×10) kinds of rigidity analysis patterns by the rigidity analyzing device 23. In this example, the rigidity analyzing device 23 reduced the 360 kinds of rigidity analysis patterns to half based on an experimental design and analyzed 180 kinds of rigidity analysis patterns. An ordinary rigidity analysis requires calculations of all of the rigidity analysis patterns. However, the optimization analyzing apparatus 1 uses the multivariate analysis method, and can obtain reliable rigidity analysis results even when the number of the rigidity analysis pattern is reduced to half as described above.

Multivariate Analyzing Device

The multivariate analyzing device 25 sets any of the rigidity, improvement rate of rigidity, and improvement rate of rigidity per increased unit weight of a structural body that are obtained by the rigidity analyzing device 23 as a response variable, sets any of the height, width, and section modulus of each of portions into which the structural body is divided as an explanatory variable, and performs a multivariate analysis for each kind of rigidity analyses performed by the rigidity analyzing device 23 to obtain a multiple regression coefficient, and a coefficient of determination or an adjusted R-square. The multivariate analysis is a statistical analysis method that finds regularity by analyzing objective phenomena. The multivariate analyses are performed to find the degree of effect of the height, width, or section modulus of each of portions into which the structural body is divided on the rigidity, improvement rate of rigidity, or improvement rate of rigidity per increased unit weight of the structural body numerically and reliably.

The multivariate analysis performed by the multivariate analyzing device 25 is specifically progressed in accordance with the following procedures. First, a relational expression for the multivariate analysis is made. Next, the multivariate analyzing device 25 obtains a multiple regression coefficient as a regression coefficient of the relational expression. The multivariate analyzing device 25 may obtain a standard partial regression coefficient other than the multiple regression coefficient as such a regression coefficient. Furthermore, the multivariate analyzing device 25 obtains a coefficient of determination that is an index indicating the degree of being able to explain a response variable by the relational expression or an adjusted R-square ($R^2$) in which the degree of freedom of the coefficient of determination is adjusted.

In this example, the multivariate analyzing device 25 sets the result of performing rigidity analyses with respect to the above-mentioned 180 rigidity analysis patterns; that is, the rigidity of the automotive body 31 as a response variable. Furthermore, the multivariate analyzing device 25 sets the cross-sectional height of each segment 331, 332, or 333 into which the rear side member 33 is divided as an explanatory variable. The multivariate analyzing device 25 creates an expression (1) as a relational expression for explaining the above-mentioned response variable with the use of the explanatory variable. The multivariate analyzing device 25 performed multivariate analyses based on the expression (1). In the expression (1), each regression coefficient $\alpha$, $\beta$, or $\gamma$ is a multiple regression coefficient or a standard partial regression coefficient. A cross-sectional height $H_1$ is the cross-sectional height of the segment 331 of the rear side member 33. A cross-sectional height $H_2$ is the cross-sectional height of the segment 332 of the rear side member 33. A cross-sectional height $H_3$ is the cross-sectional height of the segment 333 of the rear side member 33.

Rigidity=α×(cross-sectional height $H_1$)+β×(cross-sectional height $H_2$)+γ×(cross-sectional height $H_3$)      (1)

The multivariate analyzing device 25 performed the multivariate analyses of the above-mentioned 180 rigidity analysis patterns based on the expression (1). Results of the multivariate analyses are listed in Table 1. Hereinafter, results of discussion with respect to Table 1 are explained.

portion of the automotive body 31 is a portion of the coiled spring leg 35 (the predetermined portion 516 illustrated in FIG. 8). The "BL" indicates that a direction in which a load is applied to the automotive body 31 is the BL direction (the width direction of the automotive body 31). The "TL" indicates that a direction in which a load is applied to the automotive body 31 is the TL direction (the longitudinal direction of the automotive body 31). The "WL" indicates that a direction in which a load is applied to the automotive body 31 is the WL direction (the height direction of the automotive body 31). For example, in the row of "BL" of the "Shock absorber mount" of the "Local rigidity," adjusted R-squares and regression coefficients are shown when the

TABLE 1

|  |  | Torsional rigidity | | | | Local rigidity | | | | | |
|  |  | | | | | Shock absorber mount | | | Coiled spring leg | | |
|  |  | a 511 | b 512 | c 513 | d 514 | BL | TL | WL | BL | TL | WL |
| --- | --- | --- | --- | --- | --- | --- | --- | --- | --- | --- | --- |
| Adjusted R-square ($R^2$) | | 0.95 | 0.96 | 0.92 | 0.93 | 0.35 | 0.45 | 0.51 | 0.81 | 0.87 | 0.94 |
| Standard partial regression coefficient | Cross-sectional height $H_1$ | 0.22 | 0.21 | 0.44 | 0.43 | −0.21 | 0.10 | 0.21 | −0.31 | 0.06 | 0.05 |
| | Cross-sectional height $H_2$ | 0.35 | 0.36 | 0.33 | 0.32 | 0.51 | 0.46 | 0.40 | 0.30 | 0.11 | 0.15 |
| | Cross-sectional height $H_3$ | 0.51 | 0.50 | 0.25 | 0.25 | 0.30 | 0.44 | 0.38 | 0.31 | 0.93 | 0.88 |
| Multiple regression coefficient | Cross-sectional height $H_1$ | 0.10 | 0.11 | 0.05 | 0.06 | −0.01 | 0.01 | 0.01 | −0.05 | 0.05 | 0.02 |
| | Cross-sectional height $H_2$ | 0.31 | 0.34 | 0.04 | 0.03 | 0.06 | 0.04 | 0.07 | 0.13 | 0.15 | 0.29 |
| | Cross-sectional height $H_3$ | 0.59 | 0.55 | 0.01 | 0.01 | 0.02 | 0.01 | 0.03 | 0.25 | 0.87 | 0.61 |

Table 1 lists adjusted R-squares and regression coefficients (standard partial regression coefficients and multiple regression coefficients) for all kinds of 10 rigidity analyses performed in the above-mentioned rigidity analyzing device 23. In Table 1, the adjusted R-squares and the regression coefficients are separately described in the respective rows for every rigidity analysis condition and every load condition.

To be more specific, in Table 1, "a," "b," "c," or "d" described in the column of "Torsional rigidity" indicates a load condition in analyzing the torsional rigidity of the automotive body 31 illustrated in FIG. 7. The "a" indicates that a load-applied portion of the automotive body 31 is the predetermined portion 511. The "b" indicates that a load-applied portion of the automotive body 31 is the predetermined portion 512. The "c" indicates that a load-applied portion of the automotive body 31 is the predetermined portion 513. The "d" indicates that a load-applied portion of the automotive body 31 is the predetermined portion 514. For example, in the row of "a" of the "Torsional rigidity," the adjusted R-squares and the regression coefficients are shown when the torsional rigidity analysis is performed under the load condition that a load is applied to the predetermined portion 511 of the automotive body 31 and the other predetermined portions 512, 513, and 514 are constrained.

In Table 1, "Shock absorber mount," "Coiled spring leg," "BL," "TL," and "WL" of the column of "Local rigidity" indicate load conditions in analyzing the local rigidity of the automotive body 31 illustrated in FIG. 8. The "Shock absorber mount" indicates that the load-applied portion of the automotive body 31 is a portion of the shock absorber mount (the predetermined portion 515 illustrated in FIG. 8). The "Coiled spring leg" indicates that the load-applied local rigidity analysis is performed under the load condition that a load in the BL direction is applied to the predetermined portion 515 (the shock absorber mount) of the automotive body 31 illustrated in FIG. 8. Furthermore, as a load condition in analyzing the local rigidity, a portion in the vicinity of the joined portion between the lower portion of the B pillar 41 located in the middle of the automotive body 31 and a side member 43 is constrained.

In the uppermost line of numerical value columns in Table 1, the adjusted R-squares are listed. In lines below the uppermost line, the standard partial regression coefficients and the multiple regression coefficients are described. The adjusted R-square is, in a multiple regression analysis, used to adjust the degree of freedom of regression to prevent the tendency of a regression result to be improved by increasing the number of the explanatory variables.

The manner of understanding the entire contents described in Table 1 is explained. For example, when viewing the row of the "a" of the "Torsional rigidity" in Table 1, with respect to the rigidity as a result of analyzing the torsional rigidity under the load condition corresponding to the "a," the standard partial regression coefficient, the multiple regression coefficient described in the expression (1), and the adjusted R-square can be read. That is, in analyzing the torsional rigidity under the load condition corresponding to the "a," the rigidity analyzing device 23 performs the torsional rigidity analysis under the load condition that a load is applied to the predetermined portion 511 (see FIG. 7) of the automotive body 31 and the other predetermined portions 512, 513, and 514 are constrained. As a result of the torsional rigidity analysis, the rigidity of the automotive body 31 is obtained. As the regression coefficients α, β, and γ in the expression (1) and the adjusted R-square indicating correlation between the rigidity of the automotive body 31 and the cross-sectional heights $H_1$, $H_2$, and $H_3$ of the rear side member 33, values in the row of the "a" can be read. For example, when the multiple regression coefficient described in the row of the "a" is used as the regression coefficient α, β, or γ in the expression (1), a relational expression indicating correlation between the rigidity of the automotive body 31 and the cross-sectional heights $H_1$, $H_2$, and $H_3$ of the rear side member 33 is expressed as an expression (2). In this case, the adjusted R-square is 0.95.

Rigidity=0.10×(cross-sectional height $H_1$)+0.31× (cross-sectional height $H_2$)+0.59×(cross-sectional height $H_3$) (2)

The multiple regression coefficient is, in this example, an index indicating a contribution to a rigidity. The multiple regression coefficient is an absolute index, the absolute indexes being capable of being compared with each other through whole analysis conditions. When the multiple regression coefficient is investigated, the degree of contribution of the cross-sectional height $H_1$, $H_2$, or $H_3$ of each segment 331, 332, or 333 of the rear side member 33 to the rigidity of the automotive body 31 through each analysis condition can be found.

Figure 9:
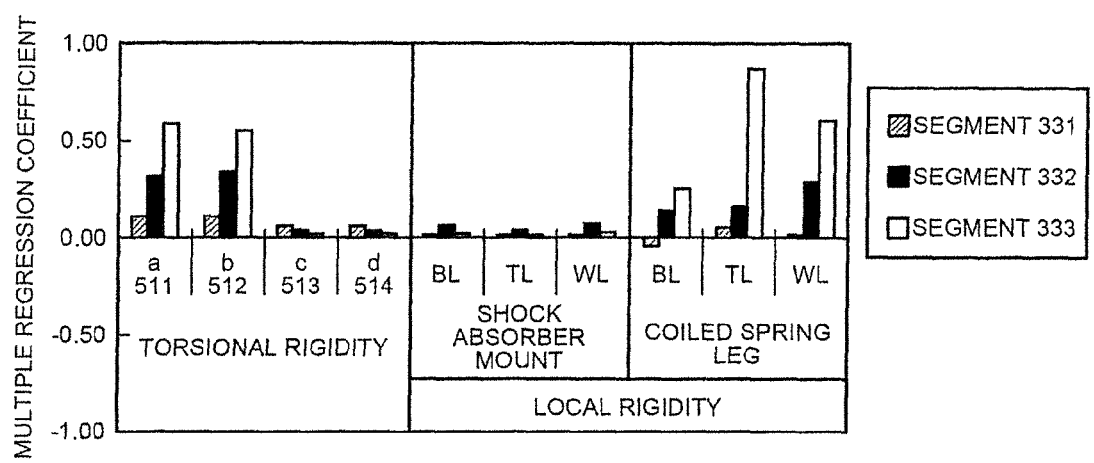
FIG. 9 is an explanatory view explaining an example of results of multivariate analyses.

FIG. 9 is a plot of the multiple regression coefficients listed in Table 1 for every analysis condition and for every load condition. In FIG. 9, a bar graph with hatched lines corresponds to the segment 331 of the rear side member 33; a black bar corresponds to the segment 332 of the rear side member 33; and a white bar corresponds to the segment 333 of the rear side member 33. When referring to FIG. 9, it can be found that the cross-sectional height $H_1$ of the segment 331 hardly contributes to the local rigidity of the shock absorber mount or the coiled spring leg. Each of the cross-sectional heights $H_2$ and $H_3$ of the segments 332 and 333 largely contributes to the torsional rigidity of the predetermined portion 511 and the predetermined portion 512 of the automotive body 31; that is, the shock absorber mount, and the local rigidity of the coiled spring leg (the predetermined portion 516 illustrated in FIG. 8). Therefore, when the cross-sectional height $H_3$ of the segment 333 is increased, it can be found that the above-mentioned torsional rigidity or the local rigidity of the coiled spring leg is improved.

Figure 10:
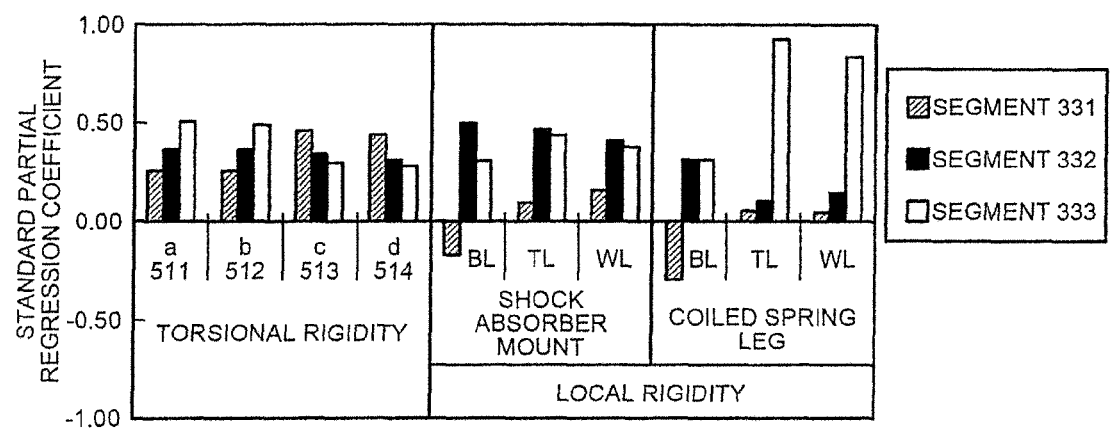
FIG. 10 is an explanatory view explaining another example of results of multivariate analyses.

The standard partial regression coefficient is an index indicating a contribution of each part portion to the rigidity of the structural body. The standard partial regression coefficient is a relative index, the relative indexes being capable of being compared with each other only under the specific analysis condition. Referring to the standard partial regression coefficient is, in finding a degree of contribution of the cross-sectional heights $H_1$, $H_2$, and $H_3$ of the segments 331, 332, and 333 of the rear side member 33 to the rigidity of the automotive body 31 in a specific rigidity analysis, easier to understand than referring to the multiple regression coefficient. Therefore, for example, when it is necessary to preferentially ensure the rigidity of the shock absorber mount in a torsional rigidity; that is, when it is necessary to improve the rigidity of a structural body in view of a specific rigidity analysis pattern, to notice the standard partial regression coefficient is more suitable than to notice the multiple regression coefficient. FIG. 10 is, in the same manner as FIG. 9, a graph of the standard partial regression coefficient described in Table 1 for every analysis condition and for every load condition. Discussion with respect to FIG. 10 is described below.

As can be noticed in reference to the "torsional rigidity" illustrated in FIG. 9 and FIG. 10, when the load condition in the torsional rigidity analysis is, for example, a load condition that a load is applied to the predetermined portion 511, the cross-sectional height $H_3$ of the segment 333 largely contributes to the torsional rigidity in the case of the multiple regression coefficients and the standard partial regression coefficient. However, the respective contributions of the segments 331 and 332 to the rigidity of the automotive body 31 are different from each other. Particularly, the contribution of the segment 331 is small in view of the multiple regression coefficient in FIG. 9, but large in view of the standard partial regression coefficient in FIG. 10. On the other hand, when the load condition in the torsional rigidity analysis is a load condition that a load is applied to the predetermined portion 513 (see FIG. 7) of the automotive body 31, in view of the multiple regression coefficient in FIG. 9, the contributions of the segments 331, 332, and 333 to the rigidity of the automotive body 31 are small. However, in view of the standard partial regression coefficient in FIG. 10, it can be confirmed that the contribution of the segment 331 is large. As a result of this discussion, the following can be understood; that is, when the torsional rigidity of the automotive body 31 is comprehensively evaluated with respect to all of the predetermined portions 511, 512, 513, and 514, the reinforcement of the segment 333 realizes the effect of improving the rigidity of the automotive body 31. However, when the rigidity values of desired portions; for example, the rigidity values of the predetermined portion 513 and the predetermined portion 514 are preferably improved to the rigidity values of all of the predetermined portions 511, 512, 513 and 514, the reinforcement of the segment 331 realizes the effect of improving the rigidities of the preferential portions.

With respect to the analysis of the local rigidity in the coiled spring leg, the following can be understood; that is, the cross-sectional height $H_3$ of the segment 333 largely contributes to the improvement of the local rigidity of the automotive body 31 with respect to loads in the TL direction and WL direction. The cross-sectional height $H_2$ of the segment 332 contributes to the improvement of the local rigidity of the automotive body 31 with respect to a load in the BL direction. The contribution of the cross-sectional height $H_1$ of the segment 331 to the local rigidity is small under any load conditions.

Rigidity Analysis Selection Device

The rigidity analysis selection device 27 selects a rigidity analysis being high in correlation among the kinds of rigidity analyses based on any of the coefficient of determination and the adjusted R-square that are obtained by the multivariate analyzing device 25. In general, it can be determined that the closer to one (1) the adjusted R-square is, the stronger the correlation of the rigidity analysis is and the higher the analysis accuracy is. In this example, as an example, the rigidity analysis in which the adjusted R-square is equal to or larger than 0.8 was determined as a rigidity analysis with high correlation and high analysis accuracy.

As described in Table 1, with respect to the torsional rigidity and the local rigidity in the coiled spring leg, all the adjusted R-squares are equal to or larger than 0.8. Based on this result, the rigidity analysis selection device 27 selects rigidity analyses with high correlation; that is, in Table 1, the torsional rigidity and the local rigidity in the coiled spring leg among the plural kinds of rigidity analyses. The rigidity analyses selected have high correlation and thus can be determined that the rigidity analyses have high analysis accuracy. Therefore, the multiple regression coefficient obtained by each multivariate analysis of the torsional rigidity and the local rigidity in the coiled spring leg can be used as an index for determining an optimized shape of a structural part such as the rear side member 33.

On the other hand, the adjusted R-square with respect to the local rigidity in the shock absorber mount is, as described in Table 1, 0.35 when a direction in which a load is applied is the BL direction, 0.45 when a direction in which a load is applied is the TL direction, and 0.51 when a direction in which a load is applied is the WL direction. Correlation of such a local rigidity analysis is moderate. Therefore, the multiple regression coefficient obtained by the multivariate analysis of the local rigidity in the shock absorber mount is not used for determining the optimized shape of a structural part.

Cross-Sectional Shape Determination Device

The cross-sectional shape determination device 29 determines the optimal cross-sectional shape of each segment of a structural part based on a multiple regression coefficient of a rigidity analysis selected by the rigidity analysis selection device 27 determining that the rigidity analysis has high analysis accuracy (strong correlation), the multiple regression coefficient being calculated by the multivariate analyzing device 25. The optimal shape of a cross-section of a part that is determined by the cross-sectional shape determination device 29 is displayed on the display device 3. Furthermore, the cross-sectional shape determination device 29 has an editor function that changes more specifically the determined optimal shape based on input information from the input device 5 in response to input operations by an operator.

In this example, the rigidity analysis selection device 27 selected, as described above, each rigidity analysis of torsional rigidities and local rigidities in the coiled spring leg as kinds of rigidity analyses with strong correlation and high analysis accuracy. The cross-sectional shape determination device 29 determined the optimal shape of the rear side member 33 based on the multiple regression coefficient of each rigidity analysis selected. As described above, the multiple regression coefficient is an index indicating contribution to rigidity. The higher the multiple regression coefficient is, the larger the contribution to rigidity becomes.

Figure 11:
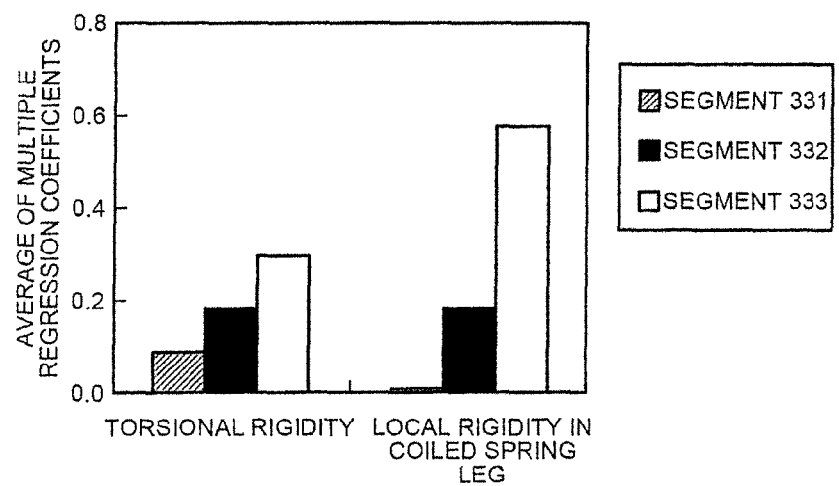
FIG. 11 is an explanatory view explaining yet another example of results of multivariate analyses.

FIG. 11 illustrates mean values of the multiple regression coefficients for the respective rigidities for each segment 331, 332, or 333 of the rear side member 33 with respect to the torsional rigidities and the local rigidities in the coiled spring leg that are selected by the rigidity analysis selection device 27.

As can be understood from FIG. 11, in both of the torsional rigidity and the local rigidity in the coiled spring leg, a value of the multiple regression coefficient of the segment 333 is high (see white bars in FIG. 11). Therefore, the contribution of the segment 333 to such rigidities is large. Next to the segment 333, the contribution of the segment 332 to such rigidities is also large. On the other hand, the contribution of the segment 331 to such rigidities is small.

In addition, by averaging both of the torsional rigidities and the local rigidities in the coiled spring legs it can be understood that which portion among the segments 331, 332, and 333 of the rear side member 33 contributes to the rigidity throughout the entire rigidity analysis conditions. As a result of averaging both of these rigidities, the multiple regression coefficient of the segment 331 is approximately 0.05, the multiple regression coefficient of the segment 332 is approximately 0.18, and the multiple regression coefficient of the segment 333 is approximately 0.41. That is, the segment 333 contributes to the rigidity most throughout the entire analysis. The segment 332 secondly contributes to the rigidity. The segment 331 hardly contributes to the rigidity.

Figure 12:
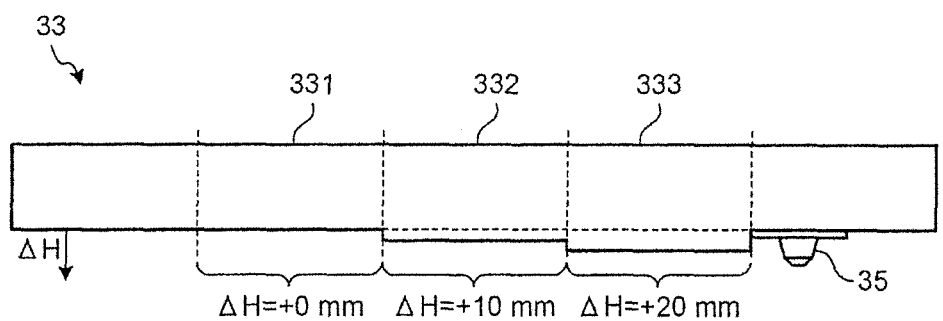
FIG. 12 is an explanatory view explaining an example of a controlled shape of the part illustrated in FIG. 3.

Accordingly, the optimal shape of the rear side member 33 may be determined based on the following conditions. Since the segment 333 contributes to a rigidity most, the cross-sectional height $H_3$ of the segment 333 is increased as much as possible. Since the segment 332 also contributes to the rigidity to some extent, the cross-sectional height $H_2$ of the segment 332 is increased. The cross-sectional height $H_1$ of the segment 331 is, in view of the reduction in weight of the automotive body 31, not increased. That is, as illustrated in FIG. 12, the displacement $\Delta H$ of the cross-sectional height $H_3$ of the segment 333 is set to the highest level of 20 mm (see FIG. 5B). The displacement $\Delta H$ of the cross-sectional height $H_2$ of the segment 332 is, in consideration of a balance with the increase in weight of the rear side member 33, set to 10 mm lower than that of the segment 333. The displacement $\Delta H$ of the cross-sectional height $H_1$ of the segment 331 is set to 0 mm to prevent the increase in weight of the rear side member 33.

Figure 13A:
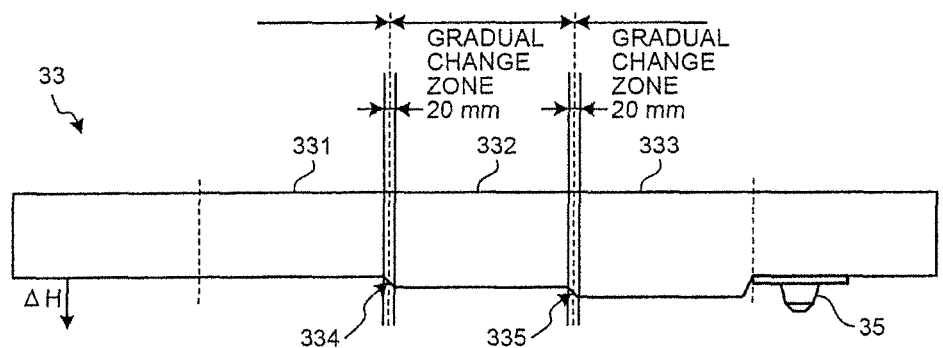
FIG. 13A is an explanatory view explaining an example of a shape obtained by further shaping the part illustrated in FIG. 12.

An operator may change the cross-sectional shape of the segment 331, 332, or 333 of the rear side member 33 to a further specific shape by using the cross-sectional shape determination device 29. As a result, a further-controlled cross-sectional shape of the segment 331, 332, or 333 may be obtained rather than the optimal shape determined by the cross-sectional shape determination device 29. For example, the cross-sectional shape determination device 29 may determine a shape of the rear side member 33 illustrated in FIG. 12 as a desired shape. Alternatively, the cross-sectional shape determination device 29 may determine the shape of a boundary portion or the shape in the vicinity of the boundary portion of each segment 331, 332, or 333 of the rear side member 33 as a gradually changing shape. To be more specific, as illustrated in FIG. 13A, the cross-sectional shape determination device 29 provides a gradual change zone 334 or 335 having a length (20 mm, for example) extending over the boundary portion of each segment 331, 332, or 333. The cross-sectional shape determination device 29 may gradually change the shape of the rear side member 33 in the gradual change zone 334 or 335. Due to such a constitution, the stress concentration on the boundary portion of each segment 331, 332, or 333 is relieved. As a result, the rigidity of the rear side member 33 as a whole and the rigidity of the automotive body 31 can be further improved.

Figure 13B:
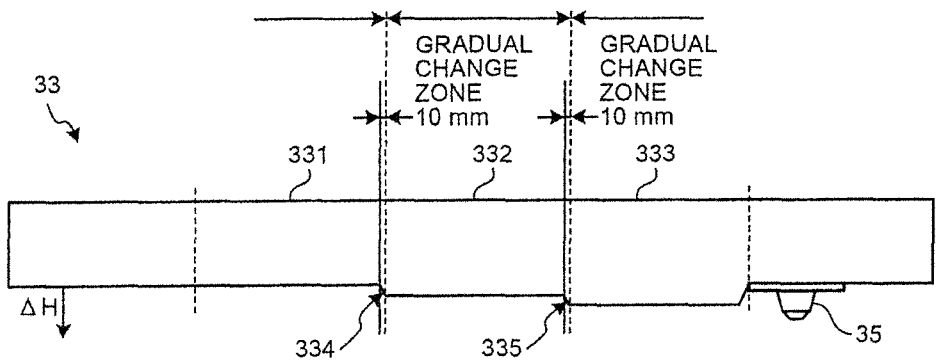
FIG. 13B is an explanatory view explaining another example of a shape obtained by further shaping the part illustrated in FIG. 12.

Furthermore, the cross-sectional shape determination device 29 may determine the shape of the boundary of each segment 331, 332, or 333 based on the contribution of the segment 331, 332, or 333 to the rigidity of the automotive body 31. Due to such a constitution, the rigidity of the automotive body 31 is further improved. To be more specific, as illustrated in FIG. 13B, the cross-sectional shape determination device 29 maintains, based on the contribution of the segment 331, 332, or 333 to the rigidity of the automotive body 31, the cross-sectional height $H_3$ of the segment 333 having a largest contribution to the rigidity as high as possible and, at the same time, provides the gradual change zone 335 having a predetermined length (10 mm, for example) only to the segment 332. Furthermore, the cross-sectional shape determination device 29 maintains the cross-sectional height $H_2$ of the segment 332 having a large contribution to the rigidity next to the segment 333 as high as possible and, at the same time, provides the gradual change zone 334 with a predetermined length (10 mm, for example) only to the segment 331. The cross-sectional shape determination device 29 may change the shape of the rear side member 33 to the optimal shape provided with the gradual change zones 334 and 335 as illustrated in FIG. 13B. Due to such a constitution, the rigidity of the automotive body 31 was further improved by 0.5%.

On the other hand, the optimization analyzing apparatus 1 may be further provided with a shape change priority determination device to determine the priority of the shape change of each of plural portions into which a structural part is divided. The standard partial regression coefficient is, as described above, suitable as an index referred to in an attempt to achieve the improvement of the rigidity of a structural body in view of predetermined analysis conditions. For example, among the torsional rigidities of the automotive body 31, when it is necessary to preferentially ensure the rigidity of the shock absorber mount, the above-mentioned shape change priority determination device may be used.

As mentioned above, in this example, the part shape pattern setting device 21 is used for dividing the rear side member 33 that is a part of the automotive body 31 in the TL direction, and the cross-sectional heights of the segments 331, 332, and 333 of the rear side member 33 are changed to set a part shape pattern thereto. Furthermore, the rigidity analyzing device 23 is used to perform rigidity analysis of the automotive body 31 based on a plurality of analysis conditions in a state in which the rear side member 33 for which the part shape pattern has been set by the part shape pattern setting device 21 is incorporated in the automotive body 31, to obtain rigidity. The multivariate analyzing device 25 is used to perform the multivariate analysis after setting the rigidity obtained by the rigidity analyzing device 23 as a response variable and setting the cross-sectional heights $H_1$, $H_2$, and $H_3$ of the segments 331, 332, and 333 as an explanatory variable to obtain a multiple regression coefficient and an adjusted R-square. In addition, the rigidity analysis selection device 27 is used to select an analysis condition with high correlation among the above-mentioned analysis conditions based on the adjusted R-square obtained by the multivariate analyzing device 25. The cross-sectional shape determination device 29 is used to determine the cross-sectional shapes of the segments 331, 332, and 333 based on the values of the multiple regression coefficients of the segments 331, 332, and 333. Due to such a constitution, the shape of the rear side member 33 can be accurately optimized.

Example 1

The manner of operation and advantageous effect of the optimization analyzing apparatus 1 is explained based on specific examples. In the above-mentioned example, the example is provided such that the multivariate analysis is performed after setting a rigidity as a response variable. In Example 1, an example is provided such that the improvement rate of rigidity is set as a response variable. In Example 1, as an example of our structural body, the automotive body 31 illustrated in FIG. 2 is exemplified; as an example of a structural part, the rear side member 33 illustrated in FIG. 3 is exemplified.

In the same manner as the case of the above-mentioned example, the part shape pattern setting device 21 is configured to divide the intermediate portion of the rear side member 33 into three portions of the segments 331, 332, and 333 in the TL direction to set a part shape pattern while changing the cross-sectional heights of the segments 331, 332, and 333. Furthermore, the part shape pattern setting device 21 changes, for example, the displacement ΔH of each cross-sectional height of the segment 331, 332, or 333 to any of three displacements (0 mm, 10 mm, 20 mm) as illustrated in FIG. 5B. The part shape pattern setting device 21 changes, for example, the displacement ΔH of each cross-sectional height of the segment 331, 332, or 333 to any of four displacements (0 mm, 10 mm, 20 mm, 30 mm) as illustrated in FIG. 5C. The shape of the segment whose displacement ΔH is 0 mm among the segments 331, 332, and 333 is same as that of the standard shape of the rear side member 33. On the other hand, the rigidity analyzing device 23 obtained, in Example 1, the improvement rate of rigidity of the automotive body 31. Accordingly, the multivariate analyzing device 25 sets, in Example 1, the response variable to the improvement rate of rigidity of the automotive body 31 and sets the explanatory variable to the cross-sectional height $H_1$, $H_2$, or $H_3$ of the segment 331, 332, or 333. The constitution of Example 1 is same as that of the example described above except that the improvement rate of rigidity is substituted with the rigidity.

Figure 14:
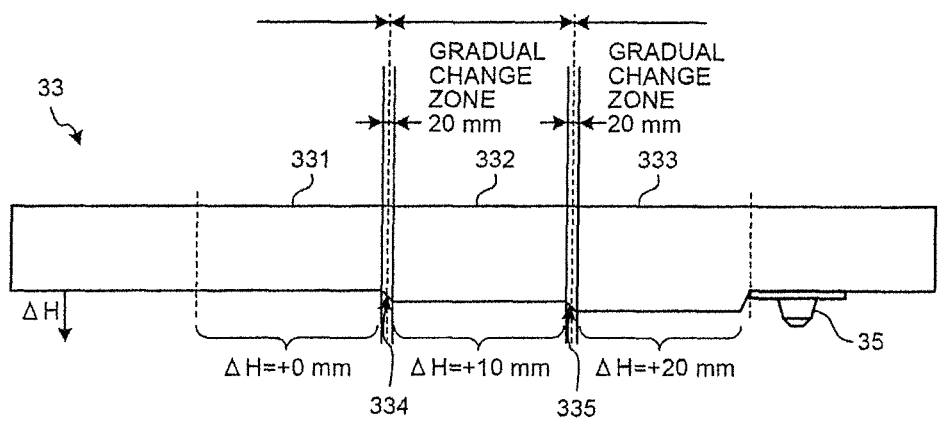
FIG. 14 is an explanatory view explaining an example of a controlled shape of a part in Example 1.

As a result of the analysis, we found that the improvement rate of rigidity increases, in the same manner as the above-mentioned example, in order of the segment 333 and the segment 332. That is, the effect of improving the rigidity of the automotive body 31 increases in order of the segment 333 and the segment 332. Accordingly, the cross-sectional shape determination device 29 set, as illustrated in FIG. 14, the displacement ΔH of the cross-sectional height $H_3$ of the segment 333 to the highest possible value (20 mm, for example). The cross-sectional shape determination device 29 set the displacement ΔH of the cross-sectional height $H_1$ of the segment 331 to 0 mm to prevent the increase in weight of the rear side member 33. The cross-sectional shape determination device 29 also increases the displacement ΔH of the cross-sectional height $H_2$ of the segment 332. In consideration of the reduction in weight of the automotive body 31, the cross-sectional shape determination device 29 set the displacement ΔH of the cross-sectional height $H_2$ of the segment 332 to a value (10 mm, for example) shorter than the cross-sectional height $H_3$ of the segment 333 and higher than the cross-sectional height $H_1$ of the segment 331. In this case, the shape of the boundary portion of the segment 331, 332, or 333 was set to a shape that gradually changes appropriately by using the editor function of the cross-sectional shape determination device 29. To be more specific, as illustrated in FIG. 14, the cross-sectional shape determination device 29 set each of the gradual change zone 334 and 335 to a zone with a length (20 mm, for example) extending over the boundary portion of each of the segment 331, 332, and 333. The improvement rate of rigidity of the automotive body 31 in the shape of the rear side member 33 illustrated in FIG. 14 was +3.4%.

The cross-sectional shape determination device 29 provided, as illustrated in FIG. 14, the gradual change zones 334 and 335 such that each of the gradual change zones extends over the boundary portion of the segments 331, 332, or 333. However, by the cross-sectional shape determination device 29 providing the gradual change zones 334 and 335 such that the cross-sectional height of the segment of the part having high contribution to the rigidity of the automotive body 31 is maintained as high as possible, the rigidity of the automotive body 31 is able to be increased further. For the purpose of further improving the rigidity of the automotive body 31, the cross-sectional shape determination device 29 changed the gradual change zones 334 and 335 of the rear side member 33 having the shape illustrated in FIG. 14 as follows. That is, the cross-sectional shape determination device 29 shrunk the gradual change zones 334 and 335 and set, for example, the length of each zone to 10 mm. Furthermore, the cross-sectional shape determination device 29 did not provide each of the gradual change zones 334 and 335 on the side of a part with large contribution to the rigidity of the automotive body 31, but provided each zone only on the side of a part with small contribution to the rigidity of the automotive body 31.

Figure 15:
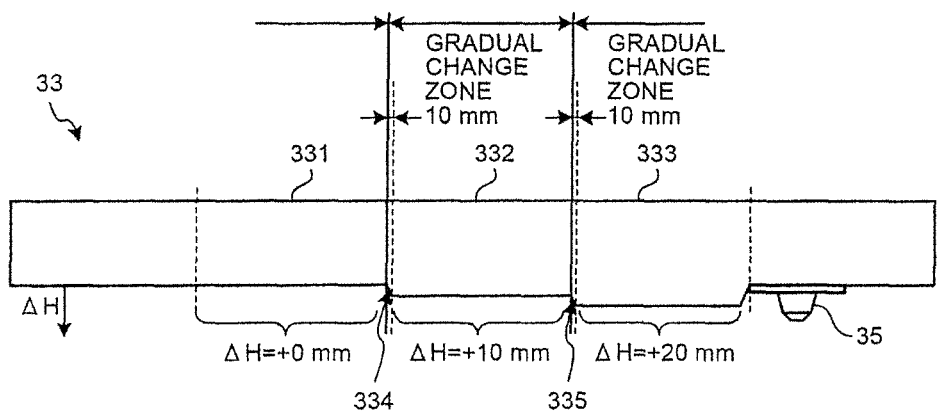
FIG. 15 is an explanatory view explaining an example of a shape obtained by further shaping the part illustrated in FIG. 14.

To explain specifically referring to FIG. 15, for example, in the boundary portion between the segment 333 and the segment 332, the cross-sectional shape determination device 29 did not provide the gradual change zone 335 on the side of the segment 333 with the relatively large contribution but provided the gradual change zone 335 (whose length is 10 mm) on the side of the segment 332 with the relatively small contribution. Furthermore, the cross-sectional shape determination device 29 did not provide, in the boundary portion between the segment 332 and the segment 331, the gradual change zone 334 on the side of the segment 332 with relatively large contribution to the rigidity of the automotive body 31 but provided the gradual change zone 334 (length=10 mm) on the side of the segment 331 with relatively small contribution to the rigidity of the automotive body 31. The improvement rate of rigidity of the automotive body 31 in the shape of the rear side member 33 illustrated in FIG. 15 was +4.2%. The improvement rate of rigidity in the shape illustrated in FIG. 15 is higher than that (=+3.4%) in the shape illustrated in FIG. 14 and thus is more preferable. In this case, the weight of the rear side member 33 increases by 257 g. Accordingly, the improvement rate of rigidity per 1 g of the increase in weight of the automotive body 31 in optimizing the shape of the part illustrated in FIG. 15 was 0.016%/g.

Figure 16:
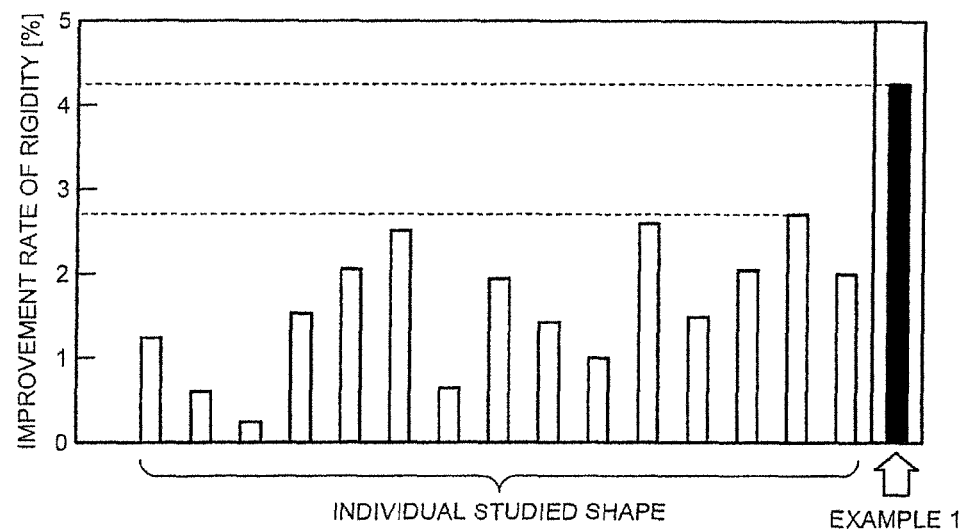
FIG. 16 is an explanatory view explaining an advantageous effect of Example 1.

A graph in which the results of the above-mentioned analyses are summarized is illustrated in FIG. 16. FIG. 16 illustrates a bar graph of results indicating high improvement rate of rigidity that are extracted from the results of analyses in Example 1. In FIG. 16, a horizontal axis indicates an examined shape, and a vertical axis indicates an improvement rate of rigidity. A black bar illustrated on the rightmost side in FIG. 16 indicates the improvement rate of rigidity in the shape illustrated in FIG. 15. Each of the other bars indicates the improvement rate of rigidity obtained as a result of performing rigidity analyses while maintaining the part shape obtained by the part shape pattern setting device 21 without gradually changing a boundary portion between segments of a part.

As illustrated by the black bar in FIG. 16, the improvement rate of rigidity in Example 1 was 4.2%. The improvement rate of rigidity is larger than the maximum value (=2.7%) of an improvement rate of rigidity obtained by total 360 kinds of rigidity analysis patterns of the rear side member 33; that is, rigidity analysis patterns when a boundary portion between segments of a part is not gradually changed. In this manner, the improvement rate of rigidity in Example 1 became more preferable. Therefore, by using the optimization analyzing apparatus 1 according to this example, the maximum value of rigidity was obtained reliably even when rigidity analyses with respect to all of 360 kinds of rigidity analysis patterns were not performed.

Example 2

In Example 1, the rigidity or improvement rate of rigidity is set as a response variable is described. However, an improvement rate of rigidity per increased unit weight may be set as a response variable. As an example of above, in Example 2, results of performing multivariate analyses by setting the improvement rate of rigidity per increased unit weight as a response variable are explained below.

A part of a structural body to be analyzed in Example 2 was, in the same manner as the case of Example 1, the rear side member 33 illustrated in FIG. 3. Furthermore, in Example 2, the rear side member 33 was, in the same manner as the case of Example 1, divided into the segments 331, 332, and 333. The level or the like of the variable $\Delta H$ of each of the cross-sectional heights $H_1$, $H_2$, and $H_3$ of the segments was the same as the case of Example 1. That is, the constitution in Example 2 is same as in Example 1 except that the rigidity or the improvement rate of rigidity is substituted with the improvement rate of rigidity per increased unit weight. Results of performing multivariate analyses in Example 2 are listed in Table 2.

TABLE 2

| | | Torsional rigidity | | | | Local rigidity Shock absorber mount | | |
|---|---|---|---|---|---|---|---|---|
| | | a 511 | b 512 | c 513 | d 514 | BL | TL | WL |
| Adjusted R-square ($R^2$) | | 0.84 | 0.85 | 0.76 | 0.74 | 0.30 | 0.37 | 0.40 |
| Standard partial regression coefficient | Cross-sectional height $H_1$ | 0.25 | 0.24 | 0.38 | 0.39 | −0.22 | 0.25 | 0.30 |
| | Cross-sectional height $H_2$ | 0.34 | 0.35 | 0.34 | 0.33 | 0.41 | 0.38 | 0.34 |
| | Cross-sectional height $H_3$ | 0.41 | 0.42 | 0.28 | 0.27 | 0.35 | 0.37 | 0.34 |
| Multiple regression coefficient | Cross-sectional height $H_1$ | 3.2E−04 | 2.4E−04 | 1.6E−04 | 2.0E−04 | −2.8E−04 | −2.0E−04 | −2.0E−04 |
| | Cross-sectional height $H_2$ | 8.0E−04 | 7.6E−04 | 1.2E−04 | 1.2E−04 | −4.0E−05 | 2.0E−04 | 2.0E−04 |
| | Cross-sectional height $H_3$ | 2.2E−03 | 2.2E−03 | 4.0E−05 | 8.0E−05 | 4.0E−05 | 8.0E−05 | 1.6E−04 |

| | | Local rigidity Coiled spring leg | | |
|---|---|---|---|---|
| | | BL | TL | WL |
| Adjusted R-square ($R^2$) | | 0.71 | 0.80 | 0.81 |
| Standard partial regression coefficient | Cross-sectional height $H_1$ | −0.25 | 0.05 | 0.08 |
| | Cross-sectional height $H_2$ | 0.40 | 0.15 | 0.21 |
| | Cross-sectional height $H_3$ | 0.32 | 0.79 | 0.71 |

TABLE 2-continued

| | | | | |
|---|---|---|---|---|
| Multiple regression coefficient | Cross-sectional height $H_1$ | −8.0E−05 | −4.0E−05 | 1.2E−04 |
| | Cross-sectional height $H_2$ | 4.4E−04 | 4.4E−04 | 4.0E−04 |
| | Cross-sectional height $H_3$ | 8.8E−04 | 2.4E−03 | 2.3E−03 |

Table 2 lists, in the same manner as the case of the above-mentioned Table 1, adjusted R-squares and regression coefficients (standard partial regression coefficients and multiple regression coefficients) of the above-mentioned ten (10) kinds of rigidity analyses. The manner of understanding the entire contents listed in Table 2 is same as the case of Table 1 and hence, the explanations thereof are omitted. Furthermore, in the same manner as the case of the above-mentioned FIG. 9, in FIG. 17, a graph of the multiple regression coefficients listed in Table 2 for every analysis condition and for every load condition is illustrated. In the same manner as the case of the above-mentioned FIG. 10, in FIG. 18, a graph of the standard partial regression coefficients listed in Table 2 for every analysis condition and for every load condition is illustrated.

Figure 17:
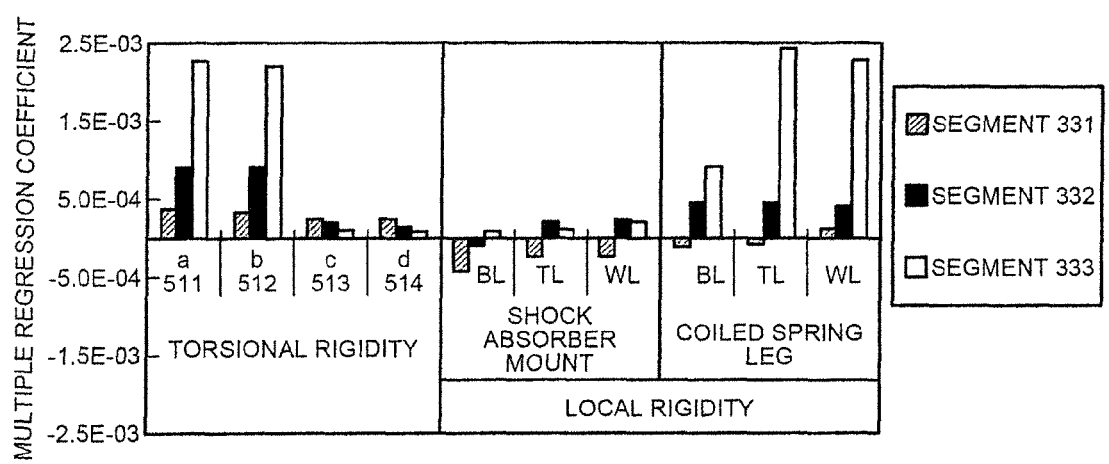
FIG. 17 is an explanatory view explaining an example of results of multivariate analyses in Example 2.

In reference to FIG. 17, it can be found that the contribution of the segment 331 to the rigidity of the automotive body 31 is small as a whole and the cross-sectional height $H_1$ of the segment 331 hardly contributes to the torsional rigidity or the local rigidity of the automotive body 31. On the other hand, each of the cross-sectional heights $H_2$ and $H_3$ of the segments 332 and 333 largely contributes to the torsional rigidity of the predetermined portion 511 or the predetermined portion 512 of the automotive body 31 illustrated in FIG. 7; that is, the shock absorber mount, and the local rigidity of the coiled spring leg (the predetermined portion 516 illustrated in FIG. 8). Particularly, the multiple regression coefficient of the segment 333 exhibits an extremely high value. These results imply that the contribution of the cross-sectional height $H_3$ of the segment 333 to the above-mentioned rigidity is large. Therefore, it can be found that the cross-sectional height $H_3$ of the segment 333 is increased in the same manner as the case of the above-mentioned example and Example 1 and thus the above-mentioned torsional rigidity or the local rigidity of the coiled spring leg is improved. Next to the segment 333, an increase in the cross-sectional height $H_2$ of the segment 332 is also effective in improving these rigidities. As mentioned above, as a result of discussion with respect to Table 2 and FIG. 17, it was found that the segment 333 and the segment 332 largely contributed to the improvement of the overall modulus of rigidity of the automotive body 31 in the order given above.

Figure 18:
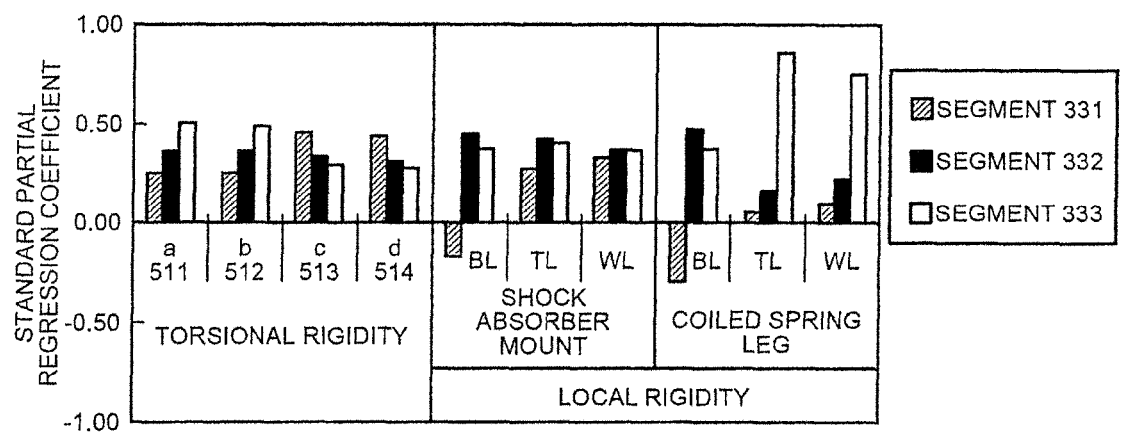
FIG. 18 is an explanatory view explaining another example of results of multivariate analyses in Example 2.

In reference to FIG. 18, in the same manner as FIG. 10, a degree of contribution of the cross-sectional height $H_1$, $H_2$, or $H_3$ of the segment 331, 332, or 333 to the rigidity of the automotive body 31 can be found. For example, when focusing on the torsional rigidity, it is reasonable to say that the segment 333 is effective for the reinforcement of all of the predetermined portions 511, 512, 513, and 514 (see FIG. 7) of the automotive body 31. On the other hand, when rigidity values of the predetermined portion 513 and the predetermined portion 514 are preferentially increased, the reinforcement of the segment 331 is effective therefor.

Results of analyses in Example 1 and Table 2 in Example 2 are compared to each other. In Example 1, the ratio of an average value of the multiple regression coefficients of the segment 332 (except the multiple regression coefficient of the shock absorber mount) to an average value of the multiple regression coefficients of the segment 333 (except the multiple regression coefficient of the shock absorber mount) was 0.45. In Example 2, the ratio mentioned above was 0.30. These results imply that when the improvement rate of rigidity per increased unit weight is set as a response variable, the contribution of the segment 332 to the rigidity of the automotive body 31 is lowered compared with the case that the improvement rate of rigidity is set as a response variable.

Figure 19:
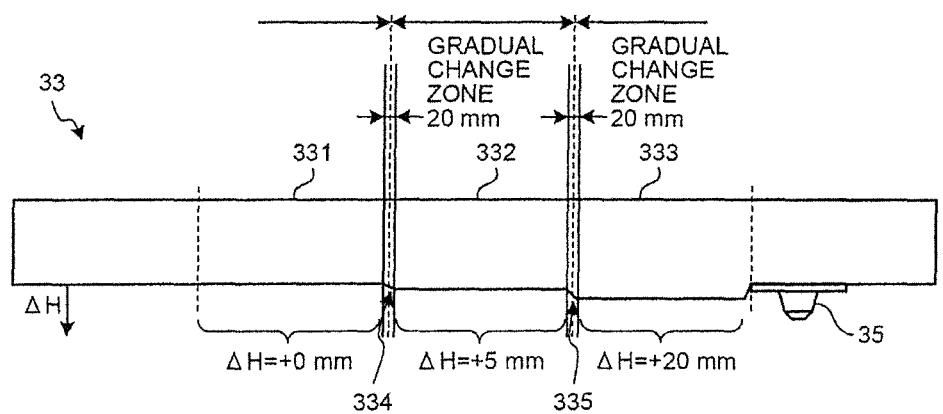
FIG. 19 is an explanatory view explaining an example of a controlled shape of a part in Example 2.
Figure 20:
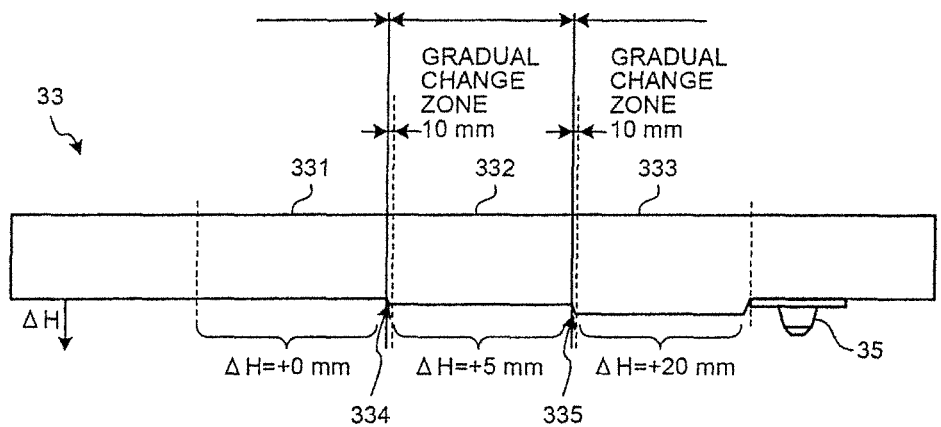
FIG. 20 is an explanatory view explaining an example of a shape obtained by further shaping the part illustrated in FIG. 19.

As a result, the shape of the rear side member 33 was determined as follows. In Example 2, the cross-sectional shape determination device 29 set, as illustrated in FIG. 19, the displacement ΔH of the cross-sectional height $H_3$ of the segment 333 to 20 mm that is a maximum value thereof. The displacement ΔH of the cross-sectional height $H_1$ of the segment 331 was set to 0 mm for preventing the increase in weight of the rear side member 33. Furthermore, the cross-sectional shape determination device 29 set the displacement ΔH of the cross-sectional height $H_2$ of the segment 332 to 5 mm that is a level lower than the case of Example 1 (10 mm). At this time, the cross-sectional shape determination device 29 provided, as illustrated in FIG. 19, the gradual change zones 334 and 335 each of which has a length (20 mm, for example) extending over the boundary portion of the segment 331, 332, or 333. A shape such that the shape of the rear side member 33 illustrated in FIG. 19 is further controlled based on the contribution of the segment 331, 332, or 333 to the rigidity of the automotive body 31 is illustrated in FIG. 20. As illustrated in FIG. 20, the cross-sectional shape determination device 29 did not provide, in the boundary portion between the segment 333 and the segment 332, the gradual change zone 335 on the side of the segment 333 with relatively large contribution to the rigidity of the automotive body 31 but provided the gradual change zone 335 (whose length is 10 mm) on the side of the segment 332 with relatively small contribution to the rigidity of the automotive body 31. The cross-sectional shape determination device 29 did not provide, in the boundary portion between the segment 332 and the segment 331, the gradual change zone 334 on the side of the segment 332 with relatively large contribution to the rigidity of the automotive body 31 but provided the gradual change zone 334 (whose length is 10 mm) on the side of the segment 331 with relatively small contribution to the rigidity of the automotive body 31. In this manner, the cross-sectional shape determination device 29 further controlled the shape of the rear side member 33.

The improvement rate of rigidity of the automotive body 31 in the shape of the rear side member 33 illustrated in FIG. 20 was +3.9%. At this time, the weight of the rear side member 33 was increased by +220 g. Accordingly, the improvement rate of rigidity per 1 g of the increase in weight in controlling the shape of the part illustrated in FIG. 20 was 0.018%/g. This value was more favorable than the improvement rate of rigidity per 1 g of the increase in weight (=0.016%/g) in Example 1.

In Examples 1 and 2, the cross-sectional height of each segment of a structural part was changed to set the part shape pattern of the structural part. However, our apparatus is not limited to these examples. The part shape pattern setting device may change the width (transverse-sectional width, for example) of each segment of a structural part to set the part shape pattern of the structural part.

In Examples 1 and 2, the cross-sectional height of each segment of a structural part was set as an explanatory variable and any of the rigidity of the structural body, the improvement rate of rigidity, or the improvement rate of rigidity per increased unit weight was set as a response variable to perform a multivariate analysis. However, our apparatus is not limited to these examples. The multivariate analyzing device in Examples 1 and 2 may set the width (transverse-sectional width, for example) of each segment of the structural part or a modulus of section as an explanatory variable to perform the above-mentioned multivariate analysis.

In Examples 1 and 2, a rigidity analysis in high correlation is selected from plural kinds of rigidity analyses based on an adjusted R-square calculated by the multivariate analyzing device. However, our apparatus is not limited to these examples. The rigidity analysis selection device may select the rigidity analysis in high correlation from plural kinds of rigidity analyses based on a coefficient of determination calculated by the multivariate analyzing device.

In Examples 1 and 2, as a rigidity of a structural body, the torsional rigidity and the local rigidity were exemplified. However, our apparatus is not limited to these examples. The rigidity of the structural body analyzed may be other than the torsional rigidity or the local rigidity, and no restriction on the kind of rigidity is imposed in particular.

In Examples 1 and 2, ten (10) kinds of rigidity analyses were exemplified. However, our apparatus is not limited to these examples. The number of kinds of rigidity analyses performed by the rigidity analyzing device may be any as long as it is plural.

In Examples 1 and 2, a structural part is divided into three in the longitudinal direction thereof. However, our apparatus is not limited to these examples. No restriction on the number of division and the direction of division of the structural part are imposed in particular. For example, based on the arrangement, the constitution, or the like of the structural part, the number of division and the direction of division that are preferable to the rigidity analysis of the structural body may be set.

In Examples 1 and 2, an automotive body as an example of the structural body is exemplified. However, our apparatus is not limited to these examples. The optimization analyzing apparatus may perform the rigidity analysis of the structural body other than the automotive body to control the shape of a part of which a structural body is constituted.

In Examples 1 and 2, a rear side member as an example of a structural part is exemplified. However, our apparatus is not limited to these examples. The optimization analyzing apparatus may control the shape of a part other than the rear side member to improve the rigidity of an automotive body or a structural body other than the automotive body.

In Examples 1 and 2, the displacement of the cross-sectional height of each of portions into which the structural part is divided is changed in three levels of 0 mm, 10 mm, and 20 mm or four levels of 0 mm, 10 mm, 20 mm, and 30 mm. However, our apparatus is not limited to these examples. The displacement of the cross-sectional height of each portion may be set to a desired quantity based on the constitution or the arrangement of the structural part.

Our apparatus is not limited to the various configurations described herein or Examples 1 and 2. This disclosure includes a case of constituting the above-mentioned constitutional features arbitrarily by combining with each other. In addition, the disclosure includes all of the other configurations, examples, applications, or the like made by those who are skilled in the art or the like based on the above-mentioned example.

INDUSTRIAL APPLICABILITY

As mentioned above, the optimization analyzing apparatus that shapes a structural part is useful to analyze a part shape of a structural body, and more particularly to accurately control the part shape of the structural body.

The invention claimed is:

1. An apparatus for designing a shape of a part of a structural body of an automotive body comprising:
    a display;
    an input device;
    a memory;
    a working data memory;
    and a processor configured to operate:
    a part shape pattern setting device that divides a part of a structural body of the automotive body including a two-dimensional element and/or a three-dimensional element into a plurality of segments in an axis direction, changes a height or width of a cross section of each of the segments divided, and sets a part shape pattern;
    a rigidity analyzing device that performs plural kinds of rigidity analyses of the structural body of the automotive body in a state in which the part of the structural body of the automotive body for which the part shape pattern has been set by the part shape pattern setting device is incorporated in the structural body of the automotive body and obtains any of: rigidity; improvement rate of rigidity; and improvement rate of rigidity per increased unit weight, of the structural body for each kind of the rigidity analyses;
    a multivariate analyzing device that performs a multivariate analysis for each kind of the rigidity analyses where any of the rigidity,
    the improvement rate of rigidity, and the improvement rate of rigidity per increased unit weight of the structural body of the automotive body that have been obtained by the rigidity analyzing device is a response variable and any of height, width, and a section modulus of each of the segments of the part of the structural body of the automotive body divided is an explanatory variable, and obtains a multiple regression coefficient, and a coefficient of determination or an adjusted R-square;
    a rigidity analysis selection device that selects, based on any of the coefficient of determination and the adjusted R-square, any having strong correlation from among the rigidity analyses of the plural kinds; and
    a cross-sectional shape determination device that determines, based on the multiple regression coefficient calculated by the multivariate analyzing device in a rigidity analysis selected by the rigidity analysis selection device, a cross-sectional shape of each of the segments of the part of the structural body of the automotive body divided;
    wherein the multivariate analyzing device calculates a standard partial regression coefficient, and the device is further configured to operate a shape change priority determination device that determines, based on the standard partial regression coefficient, a priority of change in shape of each segment of the part of the structural body of the automotive body for each of the plural kinds of rigidity analyses.

2. The apparatus according to claim 1, wherein the cross-sectional shape determination device determines a shape of a boundary portion of each of the segments of the part of the structural body of the automotive body divided or a shape in the vicinity of the boundary portion to be a gradually changing shape.

3. The apparatus according to claim 1, wherein the cross-sectional shape determination device determines a shape of a boundary portion of each of the segments of the part of the structural body of the automotive body divided or a shape in the vicinity of the boundary portion to be a gradually changing shape.

* * * * *